United States Patent [19]
Cooper

[11] Patent Number: 6,155,421
[45] Date of Patent: Dec. 5, 2000

[54] WIRE ELECTRODE LINER

[75] Inventor: William D. Cooper, Chardon, Ohio

[73] Assignee: Lincoln Global, Inc., Cleveland, Ohio

[21] Appl. No.: 09/177,585

[22] Filed: Oct. 23, 1998

[51] Int. Cl.[7] .................................................. H01B 2/99
[52] U.S. Cl. ......................... 206/400; 206/415; 206/389
[58] Field of Search .................................. 206/389, 400, 206/415, 453, 586, 597

[56] References Cited

U.S. PATENT DOCUMENTS

| | | | |
|---|---|---|---|
| D. 360,530 | 7/1995 | Bobeczko . | |
| 3,416,652 | 12/1968 | Almasy | 206/453 |
| 3,637,234 | 1/1972 | Thomas et al. | 206/453 |
| 4,513,864 | 4/1985 | Liebel | 206/586 |
| 4,938,357 | 7/1990 | Schmidt | 206/453 |
| 5,060,882 | 10/1991 | Rousculp et al. . | |
| 5,105,943 | 4/1992 | Lesko et al. . | |
| 5,139,209 | 8/1992 | Kramer . | |
| 5,238,113 | 8/1993 | Parrott et al. | 206/400 |
| 5,277,314 | 1/1994 | Cooper et al. . | |
| 5,311,996 | 5/1994 | Duffy et al. | 206/453 |
| 5,385,236 | 1/1995 | Cowan et al. | 206/453 |
| 5,494,160 | 2/1996 | Gelmetti . | |
| 5,692,700 | 12/1997 | Bobeczko . | |
| 5,819,934 | 10/1998 | Cooper . | |
| 5,861,204 | 1/1999 | O'Sullivan | 206/415 |

*Primary Examiner*—David T. Fidei
*Attorney, Agent, or Firm*—Vickers, Daniels & Young

[57] ABSTRACT

A wire coil for packaging wire which wire coil includes a liner, wire coiled about the liner and at least one wire tie which secures the coil of wire to the liner. The liner is made of a strip of flexible material and the two ends of the strip are secured together by an end securing mechanism. Each side of the strip has a tie groove that is substantially aligned with each other along the central axis of the wire coil. Each of the tie grooves receives a portion of the wire tie to secure the wire tie in position on the liner. The ends of the strip can be positioned to partially overlap one another. The wire coil may also include at least one position indicator to define the position of the two ends when connected together, and/or at least one placement slot that is positioned between the two side edges and the two ends of the strip.

36 Claims, 4 Drawing Sheets

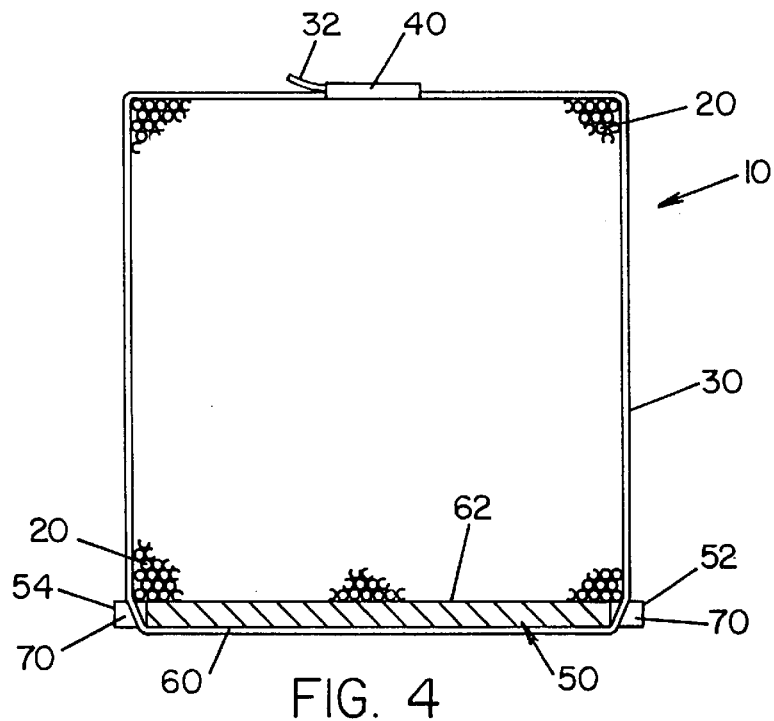
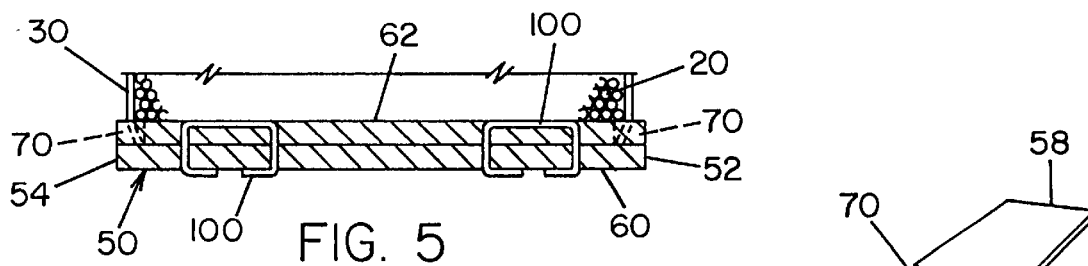
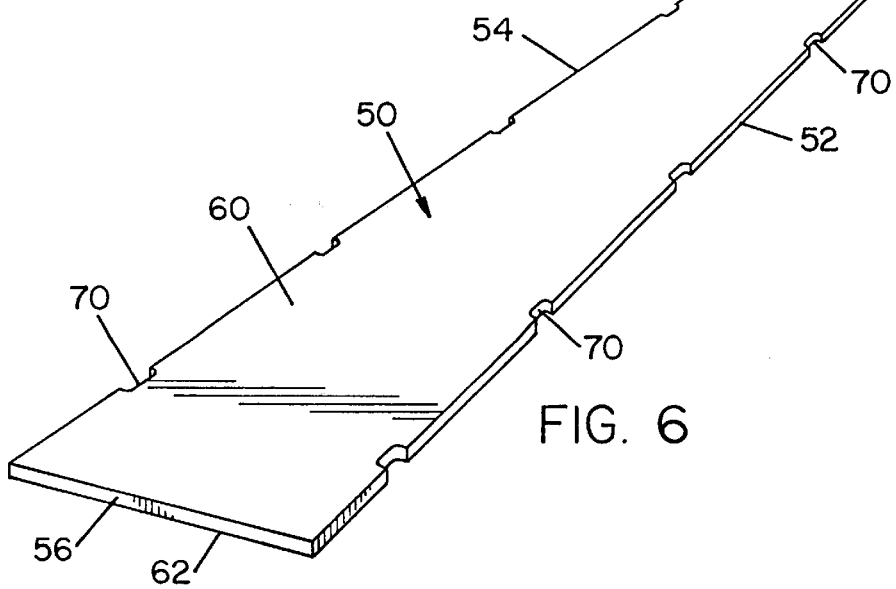

WIRE ELECTRODE LINER

BACKGROUND OF THE INVENTION

The present invention relates to a container for packaging and unwinding a coil of wire, and more particularly to a container for packaging and unwinding fine or thin welding electrode wire;

however, the invention has broader applications and can be used to package and unwind a variety of types, shapes and thicknesses of wires.

The packaging of wire is normally coiled in a continuous length within a cylindrical container or drum about a central core, or wound or coiled about a platform-supported rigid rack or reel. Several problems exist when the coiled wire is unwound and used in various applications such as in soldering and welding. These problems include the tangling of the wire as it unwinds from the wire coil, and the wire twisting or forming kinks as the wire is unwound from the wire coil. These to problems cause damage to the wire thereby resulting in the inability of the wire to be fed into the solder or welding gun, or being abruptly drawn into the soldering or welding gun, thus resulting in a lower quality and/or non-uniform weld or solder.

Two types of cylindrical containers or drums for the dispensing of coiled wire are disclosed in U.S. Pat. Nos. 5,105,943 and 5,494,160. The '943 patent discloses a cylindrical container, on which a hood with a wire guiding sheath is placed, wherein a moveable lid or disc is placed above the coil so that it can descend freely as the vertical thickness of the coil decreases. The disc has a smaller diameter than the internal diameter of the container to stabilize the coil within the container as the wire is drawn through the gap in the top of the container. The '160 patent discloses a container having a contoured top portion which reduces in cross-sectional area as the uncoiled wire proceeds to the central opening in the top of the container. A coil covering panel having a central circular opening is used in conjunction with the container to dispense the wire. Although both of these container designs help reduce the twisting and tangling of the coiled wire during dispensement, both of these wire containers have several deficiencies.

These cylindrical containers or drums are typically used to dispense thicker wire since smaller diameter wire has a tendency to easily bend and/or become tangled upon dispensement. Consequently, coiled fine wire is typically dispensed from wire reels which helps to reduce the bending and tangling of the fine wire upon dispensement. However, these coils of wire, during shipment and storage, typically become compressed resulting in problems of unwinding the wire from the reel.

In view of the deficiencies of the prior art with respect to the unwinding of welding wire, and in particular, to the unwinding of fine diameter welding wire, to prevent the tangling of the wire and/or bending of the wire during the payed out of the wire from the coil, there is a demand for an improved container for packaging and unwinding a coil of wire.

SUMMARY OF THE INVENTION

The present invention pertains to a liner for a coil of wire which improves the packing of the wire so as to reduce the amount of compression which occurs during the shipping and storage of the wire, thus improving payed out of the wire and reducing the tangling of the wire during the welding or soldering operation.

In accordance with the principal feature of the present invention, there is provided a liner made of a strip which is preferably flexible and that is formed into a shape to allow a coil of wire to be wound about the strip. Preferably, the strip is formed into a generally circular shape, however, the strip may be formed into other shapes. The strip may be made of a variety of material such as cardboard, plastic, metal, etc. In a preferred embodiment, the strip is made of a cardboard material. Each side of the strip includes at least one tie groove which is designed to receive a portion of a tie. In a preferred embodiment, each side of the strip includes a plurality of tie grooves and more preferably, at least three tie grooves. The tie grooves on both sides of the strip are positioned in such a manner that the grooves are substantially aligned with one another along the longitudinal axis of the strip or central axis of the strip, depending on the orientation of the strip.

In accordance with another feature of the present invention, the strip has a generally uniform thickness throughout the length of the strip. In a preferred embodiment, the cross-sectional shape of the strip throughout the length of the strip is substantially the same. In addition, the strip is preferably made of substantially one type of material throughout the length of the strip. By maintaining a substantially uniform shape, thickness and material of the strip, the strip when formed into a circular shape, polygonal shape or the like, will form a substantially uniform structure about the central axis of the strip, thus allowing the strip to freely rotate about its central axis as the wire about the strip is payed out from the wire coil.

In accordance with another aspect of the present invention, the strip is made up of a cardboard type material. The cardboard type of material allows the strip to be formed into longitudinal sections and subsequently bent or flexed into a circular, polygonal or the like shapes to receive the coil of wire onto the strip. When using a cardboard like material, the grain of the cardboard material is preferably arranged substantially perpendicular to the longitudinal axis of the strip so as to allow the cardboard or cardboard like material to be configured into a circular, polygonal or the like shape without damaging the cardboard fibers during the bending or flexing of the material. When a cardboard or cardboard like material is used, the liner is preferably formed into a circular shape to receive the coil of wire.

In accordance with yet another aspect of the present invention, the liner includes a securing mechanism to secure the ends of the strip together after the strip has been formed into its desired shape. The securing mechanism can be any one of a number of arrangements that adequately secures the two ends of the strip together. Such securing mechanisms include glue, tape, staples, rivets, hook and loop fasteners, tacks, tongue and groove fasteners and the like. In one preferred embodiment, a strip made up of a cardboard or cardboard like material having its ends fastened together by one or more staples. In another preferred embodiment, the ends of the strip are at least partially overlapped with one another prior to securing the ends of the strip together. This overlapped arrangement allows the securing mechanism, such as a staple, rivet, hook and loop fasteners, tacks, glue and the like, to ensure that the ends of the strip are properly fastened together.

In accordance with still yet another feature of the present invention, the tie grooves on the side of the strip allow one or more ties to be used to secure a coil of wire which has been placed or wound about the strip to be secured and compressed onto the strip. The compression of the coil of wire onto the strip by the ties reduces or eliminates any further compression of the coil of wire during shipping and storage which further compression causes the wire to tangle or bend when being payed out from the coil of wire. The ties used to secure the coiled wire to the liner may be made of a variety of materials such as plastic, metal, nylon, cotton or the like. Preferably, the ties are metal or plastic ties, which ties do not readily stretch or expand over time, thus inhibiting or preventing the tension being applied to the coil of wire during shipping and storage from becoming reduced. In the preferred embodiment, the width of the ties is selected so that the width is the same size or smaller than the width of the tie slots on the sides of the strip. This selection of size of the width of the ties allows the ties to fit within the tie slots so as to be secured in place on the strip and to further direct the desired tension forces onto the coil of wire.

In accordance with another feature of the present invention, the strip includes one or more positioned indicators which are positioned on one or both ends of the strip. The position indicators are used to define an exact or approximate position where the ends of the strip are to be positioned together so as to obtain the desired shape of the strip when formed into a circle, polygonal shape or the like. The position indicators may take many forms such as markings, grooves, cavities, notches, or the like. In one preferred embodiment, the position indicators include two slots which are spaced from one end of the strip. The slots are used to align the two ends of the strips together such that one end of the strip is positioned closely to but do not overlap the positioning slots. In such an arrangement, the ends of the slots overlap one another, and once positioned in their proper position, are secured together by a securing mechanism such as a staple or the like.

In accordance with still another feature of the present invention, the strip includes one or more placement slots that are positioned between the two sides of the strip and between the two ends of the strip. The placement slot functions as a positioned indicator to allow an operator to properly position the liner within a mounting device so as to properly spool the wire onto the strip and/or to payed out the wire from the coil of wire. In a preferred embodiment, the strip includes at least one pair, and preferably a plurality of pairs of placement slots so as to provide an accurate indicator of how the liner should be properly mounted.

In accordance with yet still another feature of the present invention, the strip includes a tension mechanism whereby the liner can be secured to a reel, drum or the like. The tension mechanism enables the wire to be coiled onto the liner in a tension manner and/or allow the wire to be payed out from the roll in a tension manner. The maintaining of tension on the wire during the spooling of the wire onto the liner reduces the amount of compression of the coil of wire during shipping and storage, reduces the tendency of the wire to tangle as it is being spooled onto the liner, and further increases the amount of wire which can be spooled onto the liner. When the wire is being payed out from the coil of wire, such as during a welding or soldering operation, the wire is preferably remained under tension to reduce the tendency of the wire to tangle or bend as it is being payed out from the coil of wire. The maintaining of tension on the wire during the paying out from the coil of wire is highly preferable for small diameter wires which have a higher tendency to bend and/or tangle while being unrolled from a coil of wire. In a preferred embodiment, one or more placement slots and/or one or more position indicators function as the tension mechanism.

The primary object of the present invention is the provision of a liner upon which a coil of wire can be mounted thereon and in a manner which reduces the compression of the coil of wire during shipping and storage of the coiled wire.

Another object of the present invention is the provision of a liner which can be easily and economically formed into a desired shape so as to receive a coil of wire and to pay out the wire from the coil.

Yet another object of the present invention is the provision of a liner which can be easily mounted into a welding or soldering machine by a user.

Still yet a further object of the present invention is the provision of a liner which enables tension to be placed upon the wire as the wire is being rolled into a coiled wire onto the liner and/or payed out from the coiled wire on the liner.

Yet a further object of the present invention is the provision of a spool of wire which can be made to hold a wide variety of sizes shapes of wire and which wire upon being payed out from the spool has a reduced tendency to result in tangling and/or bending of the wire.

Still a further object of the present invention is the provision of a wire spool that can be stacked upon one another to increase the ease and economy of transport and storage of the spools of wire.

Yet a further object of the present invention is the provision of a spool liner for a coil of wire which is made of inexpensive and disposable materials.

These and other objects and advantages will become apparent from the following description taken together with the accompanied drawings.

BRIEF DESCRIPTION OF THE DRAWINGS

FIG. 4 is a cross-sectional area taken generally along line 4—4 of FIG. 3;

FIG. 5 is a cross-sectional area taken generally along line 5—5 of FIG. 3;

FIG. 6 is a side elevational view of a liner prior to being formed to its circular shape as shown in FIG. 1;

PREFERRED EMBODIMENT OF THE INVENTION

Figure 1:
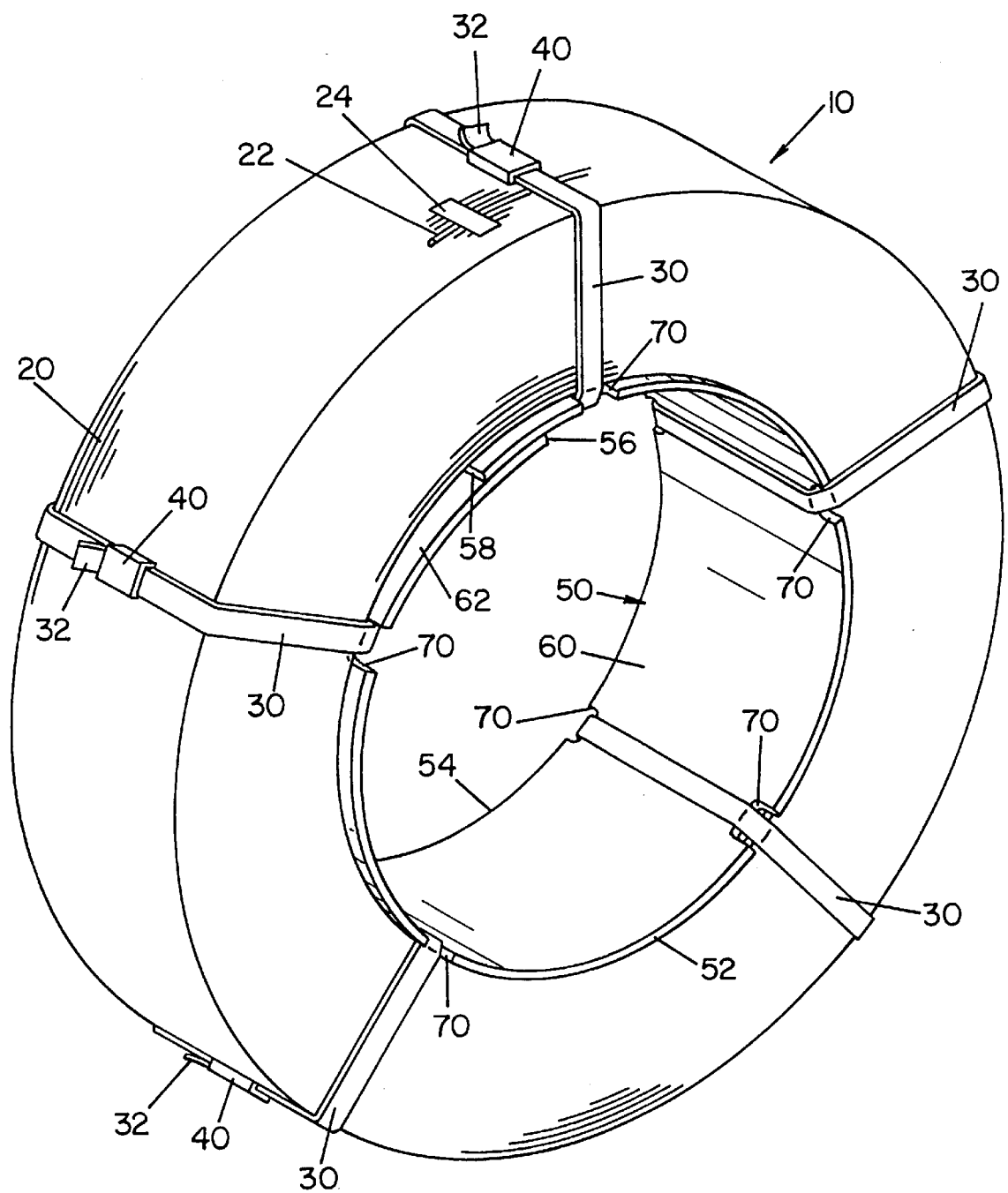
FIG. 1 is a side elevational view of a coil of wire tied to a liner in accordance with the present invention.
Figure 2:
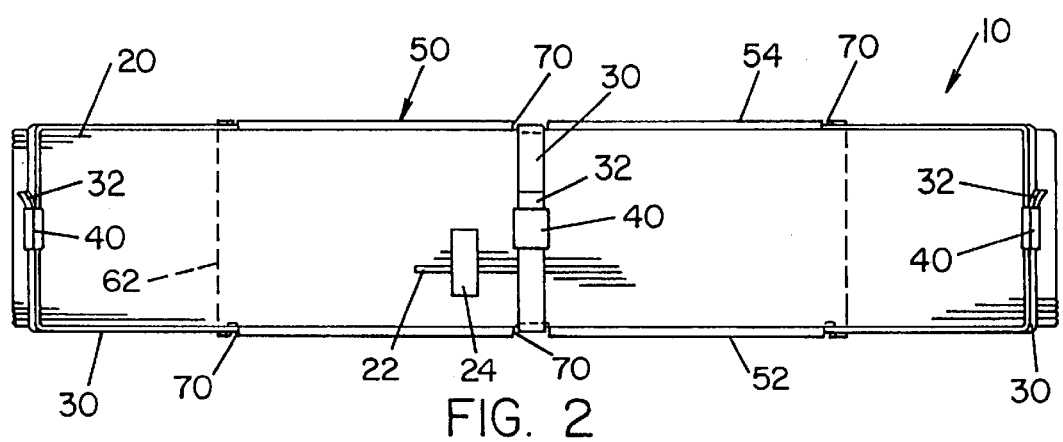
FIG. 2 is a top view of the coil of wire as shown in FIG. 1.
Figure 3:
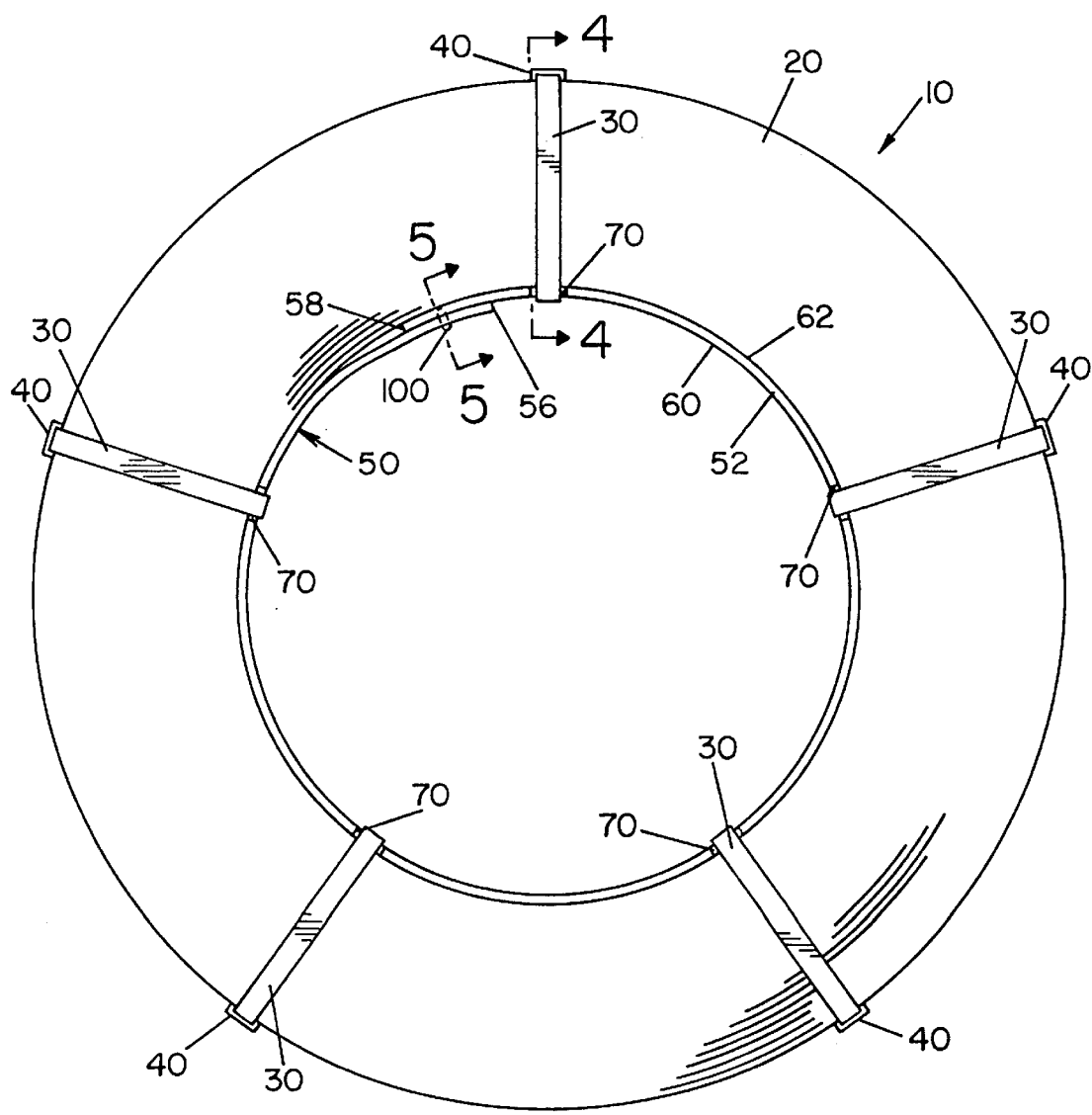
FIG. 3 is a side view of the coil of wire as shown in FIG. 1.

Referring now to the drawings, wherein the showing is for the purpose of illustrating a preferred embodiment of the invention and not for the purposes of limiting the same, FIGS. 1–3 illustrates a wire coil 10 having a coil of wire 20 secured to a liner strip 50 by five ties 30. Wire lead 22 of wire 20 is secured in place by wire tab 24 such as a piece of tape or the like.

As specifically shown in FIGS. 1 and 3, ties 30 are spaced substantially equal distances apart from one another and about the perimeter of the wire coil so as to evenly secure the wire 20 to liner strip 50. The ties 30 are preferably made of a plastic or metal material. The end of the ties are secured together by a tie clamp 40. Preferably the ends of the ties are pulled together to generally create a relatively high tension prior to the tie clamp securing the ends of the tie together. Tie clamp 40 may be made of a variety of materials such as a hard plastic or metal material. Preferably the tie clamp 40 is designed to allow tie end 32 to be pulled through tie clamp 40 so as to enable the desired tension to be applied by tie 30 onto wire 20. However, tie clamp 40 may take on any number of other arrangements to properly secure the ends of tie 30 together.

Referring now to FIG. 6, liner strip 50 is shown as being a generally rectangular shaped material having a generally uniformed cross-sectional shape in thickness. Positioned along strip side 52 and 54 are five tie grooves 70. The tie grooves 70 are positioned on both sides of liner strip 50 in such a manner that tie grooves 70 align with one another along the longitudinal axis of liner strip 50. Tie grooves 70 are designed to have substantially the same size and shape as one another. In a specific embodiment, a strip of approximately forty inches long has the tie grooves 70 spaced approximately seven to eight inches apart along the longitudinal length of the strip. The width of the tie grooves on such a strip are approximately 0.5 to 0.8 inch and have a depth of approximately 0.15 to 0.35 inch. As can be appreciated, the dimensions of the strip length, the spacing of the tie grooves, the width of the tie grooves and depth of the tie grooves can be varied depending on the desired length of the strip and the types of ties used to secure the wire to the liner. The width of the tie groove is selected such that the tie groove has a width of at least the width of the tie such that the tie can fit within the tie groove.

Figures 7, 8:
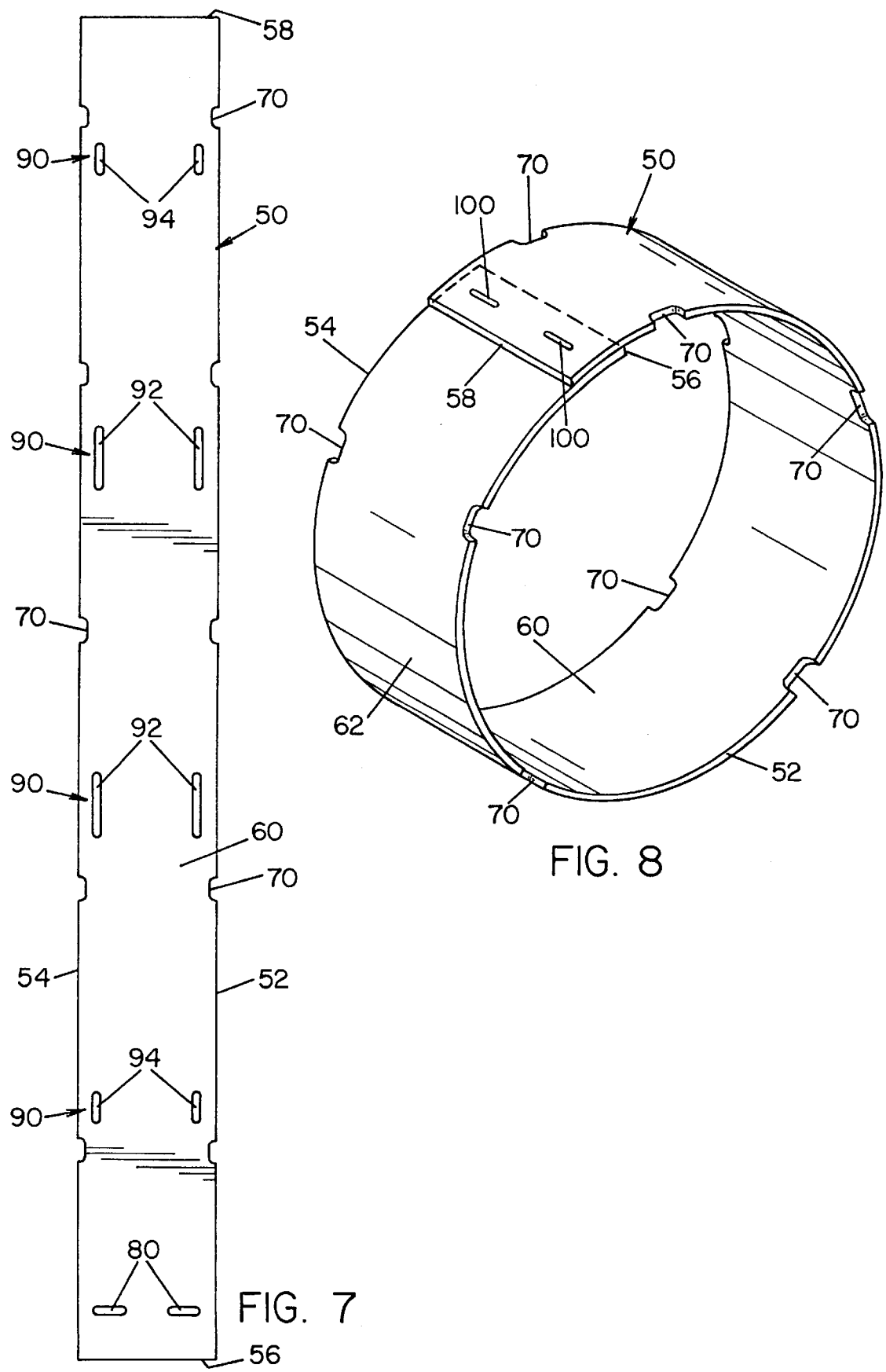
FIG. 7 is an alternate embodiment of the strip shown in FIG. 5 and includes positioning the placement slots along the longitudinal length of the strip.
FIG. 8 is a side elevational view of the strip of FIG. 6 formed to a circular shape and having the ends of the strips secured together.

Referring now to FIG. 8, liner strip 50 is formed into a generally circular shape and strip ends 56 and 58 are secured together by two staples 100. As shown in FIG. 5, staples 100 penetrate the two ends of the strip thereby securing the ends together. The ends of the strip are positioned together such that the tie grooves are spaced at generally equal distances apart from one another.

Once liner strip 50 has been formed into a circular shape as shown in FIG. 8, wire 20 is wound about liner strip 50 to form a coil of wire as shown in FIG. 1. Wire 20 is coiled onto liner strip 50 in a tension manner to form the coil of wire as shown in FIG. 1 on the outer face of 62 of liner strip 50 by conventional winding methods and will not be further herein described. Once the desired amount of wire 20 is coiled onto outer face 62 of liner strip 50, ties 30 are placed about coil of wire 20 and positioned into tie grooves 70 on liner strip 50. The ties ends 32 are then pulled to compress the coil of wire 20 onto liner strip 50. Once the desired tension of tie 30 is obtained, tie clamp 40 secures the ends of the tie together. As best shown in FIG. 4, as tie ends 32 are pulled apart, the top surface, the two sides and all four corners of the coiled wire are compressed together. Tie grooves 70 allow the edges of coiled wire 20 on outer face 62 of liner strip 50 to be compressed along with the top edges of the wire as the tie ends 32 are pulled apart. This compression of all four corners of the coil of wire ensures that the coil of wire is substantially fully compressed during packaging so as to inhibit or prevent further compression of the coiled wire during shipping and storage, which further compression can result in an improper payed out of the wire from the wire coil 10.

Referring now to FIG. 7, an alternate embodiment of liner strip 50 is disclosed. In this embodiment, liner strip 50 includes two position slots 80 which are spaced at some distance from strip end 56, 58. Also included on liner strip 50 is a plurality of placement slots 90. Four sets of placement slots are positioned along the longitudinal axis of the liner strip. Two sets of small slots 94 are positioned near strip ends 56 and 58 of liner strip 50. Two sets of large slots 92 are positioned between the sets of small slots 94.

Position slots 80 function as position indicators for the positioning of strip ends 56 and 58. Preferably, position slots 80 are spaced at a distance from strip end 56 such that strip end 58 is positioned closely to, but in a non-overlapping relationship with position slots 80 thereby defining the position of strip end 58 relative to strip end 56 prior to securing the ends together by staples 100. Position slot 80 also can function as a position indicator during the winding process of the wire onto liner strip 50. During the winding of wire 20 onto liner strip 50, a mechanism can be used to measure the revolutions of position slots 80 so as to control the amount of wire being placed onto liner strip 50.

Placement slots 90 are designed to be used as markers to enable an operator to properly mount the wire coil 10 onto a machine such as a welding or soldering machine. Placement slots 90 can also be used to secure wire coil 10 in place on a machine so that the wire 20 is payed out from wire coil 10 in a tension manner. As can be appreciated, position slot 80 can also be used in conjunction with placement slots 90 to create the desired payed out tension on wire 20.

Inner face 60 of liner strip 50 provides a surface for the placement of warnings, instructions, labels and the like which relate to wire coil 10.

The invention has been described with reference to a preferred embodiment and alternates thereof. It is believed that any modifications and alterations to the embodiments discussed herein will readily suggest itself to those skilled in the art upon reading and understanding the detailed description of the invention. It is intended to include all such modifications and alterations insofar as they come within the scope of the present invention.

After having thus described the present invention, it is claimed:

1. A liner for supporting a coil of wire comprising a strip having two side edges, each of said side edges including at least one tie groove positioned on each of said side edges, said tie grooves on each side edge of said strip being substantially aligned with one another, said strip includes two ends, said liner including a securing mechanism to secure together each of the ends of said strip in a secured position.

2. A liner as defined in claim 1, wherein each end of said strip has a cross-sectional shape which is substantially the same in size and in shape.

3. A liner as defined in claim 1, wherein each of said side edges of said strip having a plurality of tie grooves, each of said tie grooves on one side of said strip being substantially aligned with said tie grooves on said other side of said strip.

4. A liner as defined in claim 2, wherein each of said side edges of said strip having a plurality of tie grooves, each of said tie grooves on one side of said strip being substantially aligned with said tie grooves on said other side of said strip.

5. A liner as defined in claim 1, wherein said strip formed into a generally circular shape.

6. A liner as defined in claim 3, wherein said strip formed into a generally circular shape.

7. A liner as defined in claim 4, wherein said strip formed into a generally circular shape.

8. A liner for supporting a coil of wire comprising a strip having two side edges, each of said side edges including at least one tie groove positioned on each of said side edges, said tie grooves on each side edge of said strip being substantially aligned with one another, said strip formed into a generally circular shape, each of said side edges of said strip having a plurality of tie grooves, each of said tie grooves on one side of said strip being substantially aligned with said tie grooves on said other side of said strip, said strip includes two ends, said liner including a securing mechanism to secure together each of the ends of said strip in a secured position.

9. A liner for supporting a coil of wire comprising a strip having two side edges, each of said side edges including at least one tie groove positioned on each of said side edges, said tie grooves on each side edge of said strip being substantially aligned with one another, said strip formed into a generally circular shape, each of said side edges of said strip having a plurality of tie grooves, each of said tie grooves on one side of said strip being substantially aligned with said tie grooves on said other side of said strip, each end of said strip has a cross-sectional shape which is substantially the same in size and in shape, said strip includes two ends, said liner including a securing mechanism to secure together each of the ends of said strip in a secured position.

10. A liner for supporting a coil of wire comprising a strip having two side edges, each of said side edges including at least one tie groove positioned on each of said side edges, said tie grooves on each side edge of said strip being substantially aligned with one another, said strip formed into a generally circular shape, said ends of said strip at least partially overlap in said secured position.

11. A liner as defined in claim 8, wherein said ends of said strip at least partially overlap in said secured position.

12. A liner as defined in claim 9, wherein said ends of said strip at least partially overlap in said secured position.

13. A liner for supporting a coil of wire comprising a strip formed into a generally circular shape and having two side edges and including at least one position indicator to define the position of said two ends in a secure position, each of said side edges including at least one tie groove positioned on each of said side edges, at least a portion of said tie groove is spaced inwardly from the side edge of said strip, said tie grooves on each side edge of said strip being substantially aligned with one another.

14. A liner as defined in claim 9, including at least one position indicator to define the position of said two ends in said secure position.

15. A liner as defined in claim 11, including at least one position indicator to define the position of said two ends in said secure position.

16. A liner as defined in claim 12, including at least one position indicator to define the position of said two ends in said secure position.

17. A liner as defined in claim 1, including at least one placement slot, said placement slot positioned between said two side edges of said strip.

18. A liner as defined in claim 15, including at least one placement slot, said placement slot positioned between said two side edges of said strip.

19. A liner as defined in claim 16, including at least one placement slot, said placement slot positioned between said two side edges of said strip.

20. A liner as defined in claim 10, including at least one placement slot, said placement slot positioned between said two side edges of said strip.

21. A wire coil for packaging a wire comprising a liner, wire coiled about the liner and at least one wire tie, said liner including a strip and an end securing mechanism, said strip having two sides and two ends, said two ends secured together in a secured position by said end securing mechanism, each of said two sides of said strip including a tie groove substantially aligned with each another along the central axis of said wire coil, each of said tie grooves receiving a portion of said wire tie to secure said wire tie in position, said wire tie securing said wire to said liner.

22. A wire coil as defined in claim 21, wherein said ends of said strip at least partially overlap in a secured position.

23. A wire coil as defined in claim 21, including at least one position indicator to define the position of said two ends in said secure position.

24. A wire coil as defined in claim 22, including at least one position indicator to define the position of said two ends in said secure position.

25. A wire coil as defined in claim 21, including at least one placement slot, said placement slot positioned between said two side edges and said two ends of said strip.

26. A wire coil as defined in claim 23, including at least one placement slot, said placement slot positioned between said two side edges and said two ends of said strip.

27. A wire coil as defined in claim 24, including at least one placement slot, said placement slot positioned between said two side edges and said two ends of said strip.

28. A wire coil as defined in claim 21, wherein said strip formed into a generally circular shape.

29. A wire coil as defined in claim 27, wherein said strip formed into a generally circular shape.

30. A wire coil as defined in claim 21, including a wire tab which secures an end of said wire in place.

31. A wire coil as defined in claim 29, including a wire tab which secures an end of said wire in place.

32. A wire coil as defined in claim 21, including a tie clamp to secure together ends of said tie.

33. A wire coil as defined in claim 31, including a tie clamp to secure together ends of said tie.

34. A wire coil as defined in claim 26, including a tie clamp to secure together ends of said tie.

35. A wire coil as defined in claim 33, wherein at least a portion of said tie groove spaced inwardly from the side edge of said strip.

36. A wire coil as defined in claim 21, wherein at least a portion of said tie groove spaced inwardly from the side edge of said strip.

* * * * *